No. 778,410.

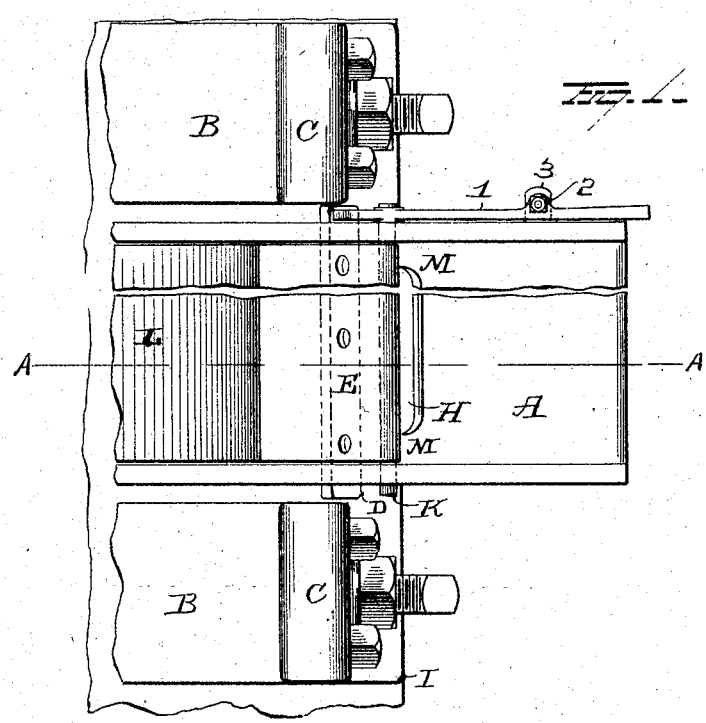
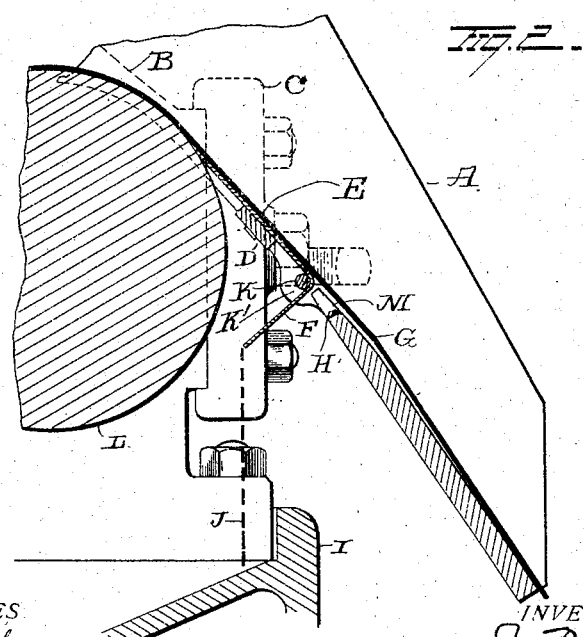

Patented December 27, 1904.

UNITED STATES PATENT OFFICE.

JOHN PORTER GOLDEN, OF COLUMBUS, GEORGIA.

CANE-MILL.

SPECIFICATION forming part of Letters Patent No. 778,410, dated December 27, 1904.

Application filed July 26, 1904. Serial No. 218,232.

*To all whom it may concern:*

Be it known that I, JOHN PORTER GOLDEN, a resident of Columbus, in the county of Muscogee and State of Georgia, have invented certain new and useful Improvements in Cane-Mills; and I do hereby declare the following to be a full, clear, and exact description of the invention, such as will enable others skilled in the art to which it appertains to make and use the same.

My invention relates to an improvement in cane-mills, and more particularly to improved scraper construction for the lower smaller roll of horizontal cane-mills at the bagasse-discharge chute, the object of the invention being to provide an improved construction of scraper which will direct juice back into the mill that would otherwise be carried off with the bagasse and be lost; and with this object in view the invention consists in certain novel features of construction and combinations and arrangements of parts, as will be more fully hereinafter described, and pointed out in the claims.

In the accompanying drawings, Figure 1 is a fragmentary plan view illustrating my improvements, and Fig. 2 is a view in section on the line *x x* thereof.

My invention is designed as an improvement over the usual style of scraper and bagasse-chute used in horizontal cane-mills where there is practically a continuous surface from point of contact of scraper with small roll to end of chute, which in case of juice coming through between large and small rolls as cane is pressed would run out of bagasse-chute with bagasse and thus be lost, whereas in my improvement the juice runs down over right-angle end of scraper E at F and into bottom of mill through an opening in chute at H, so located as to not allow of bagasse entering or clogging same.

A represents the lower part of bagasse-chute, the upper end of which is similar to the usual style for this type of mill, a scraper being hinged near top to scrape the large roll. The bagasse or crushed cane having a tendency to stick to small roll after being scraped from large roll, I hinge a scraper E upon a rod K, supported by lugs K' on side of chute A. The chute is cut away between sides, as shown in plan, scraper E resting against lugs M M at ends of slot H. The object of cutting out box between lugs M M is to allow any juice that might be carried along with the bagasse G to run down part of scraper lettered F into the bottom of mill, as at J, thence out the spout at end of mill I.

To scraper E is attached on its under side by rivets a wrought-iron strap D, extending beyond side of scraper E nearly to side of caps C, which limit side movement of scraper.

A lever 1 is pivoted on rod K, held in lugs K' at under side of the chute, one end of the lever 1 bearing on strap D, with the outer end adjusted by a screw 2 through a lug 3 on side of chute near bottom end, which keeps the scraper in contact with the roll to be scraped.

B B are housings to which the upper end of chute is attached by lugs.

A great many slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a cane-mill discharge-chute having an opening therein, of a scraper mounted within the opening in said chute and adapted to engage roll of the mill, said scraper having a part to direct juice back into the mill.

2. The combination with a cane-mill discharge-chute having an opening therein, of an angle scraper having one end against a mill-roll and the other projecting through said opening to direct juice back into the mill.

3. The combination with a cane-mill discharge-chute having an opening therein, of an angle scraper having one end against a mill-roll and the other projecting through said opening to direct juice back into the mill, and means for adjusting the pressure of the scraper on its roll.

4. The combination with a cane-mill bagasse-discharge chute for horizontal cane-mills having an opening therein, and a roll in said mill, of a sheet-metal scraper of angle shape pivoted at its angle on a cross-rod, and bearing at one end against the roll and its other end projecting through the opening into the chute to direct juice back into the mill, a bar or strap on the scraper projecting beyond the side edge thereof, a lever fulcrumed on the cross-rod and bearing at one end on the bar, and a set-screw to adjust the other end of the lever and regulate the pressure of the scraper against its roll.

In testimony whereof I have signed this specification in the presence of two subscribing witnesses.

JOHN PORTER GOLDEN.

Witnesses:
C. D. McPHAIL,
N. L. DUDLEY.